(12) United States Patent
Huang (10) Patent No.: US 10,184,608 B2
(45) Date of Patent: Jan. 22, 2019

(54) AUTOMATIC PITCH ADJUSTMENT MACHINE

(71) Applicant: Hsin-Po Huang, Taoyuan (TW)

(72) Inventor: Hsin-Po Huang, Taoyuan (TW)

( * ) Notice: Subject to any disclaimer, the term of this patent is extended or adjusted under 35 U.S.C. 154(b) by 0 days.

(21) Appl. No.: 15/910,331

(22) Filed: Mar. 2, 2018

(65) Prior Publication Data

US 2018/0259117 A1 Sep. 13, 2018

(30) Foreign Application Priority Data

Mar. 10, 2017 (TW) .................................. 106203383

(51) Int. Cl.
*B65G 47/28* (2006.01)
*F16M 11/20* (2006.01)

(52) U.S. Cl.
CPC ......... *F16M 11/2092* (2013.01); *B65G 47/28* (2013.01)

(58) Field of Classification Search
CPC ...... B65G 47/26; B65G 47/28; B65G 47/907; B65G 47/918; B25J 15/0052; B65B 35/36; B65B 35/38
USPC .............. 198/375; 414/416.02, 749.5, 751.1, 414/752.1
See application file for complete search history.

(56) References Cited

U.S. PATENT DOCUMENTS

| | | | | |
|---|---|---|---|---|
| 4,425,074 A * | 1/1984 | Becker | ................ | B65G 47/26 198/468.3 |
| 4,832,180 A * | 5/1989 | Ferrero | ................ | B65B 35/38 198/468.3 |
| 5,273,152 A * | 12/1993 | Brun | ................ | B29C 49/4215 198/468.3 |
| 6,439,631 B1 * | 8/2002 | Kress | ................ | B65G 47/918 294/65 |
| 7,464,807 B2 * | 12/2008 | Ham | ................ | G01R 31/2893 198/468.3 |
| 8,141,922 B2 * | 3/2012 | Shim | ................ | H01L 21/6838 294/65 |
| 8,876,182 B2 * | 11/2014 | Eidelberg | ................ | B66C 1/00 198/468.3 |
| 9,511,497 B2 * | 12/2016 | Kim | ................ | G01R 31/2867 |

* cited by examiner

*Primary Examiner* — William R Harp
(74) *Attorney, Agent, or Firm* — Rosenberg, Klein & Lee (57) ABSTRACT

An automatic pitch adjustment machine has a base board, a first slide rail set, a transfer set, a second slide rail set, a cylinder adapter plate, and a material carrier set. The the first slide rail set is mounted on the top surface of the base board. The transfer set has multiple transfer blocks, and each one of the transfer blocks is fixed to a respective lower sliding block of the second slide rail set. The second slide rail set has multiple short rails and multiple upper sliding blocks. The cylinder adapter plate has a driving plate and multiple driving pillars. The material carrier set has multiple material fixing boards, and the multiple material fixing boards are spaced at intervals.

12 Claims, 7 Drawing Sheets

AUTOMATIC PITCH ADJUSTMENT MACHINE

BACKGROUND OF THE INVENTION

1. Field of the Invention

The invention relates to a pitch adjustment machine, and more particularly to an automatic pitch adjustment machine which can automatically separate components at intervals of a specific distance during a manufacturing process.

2. Description of Related Art

During processes for manufacturing products in a factory, especially for products of a small volume, the products would be transported from one working station to a next working station. These small products or materials are transported in different quantities. Due to the configurations of apparatuses or the manufacturing space, the products or materials are moved from one working station to another. The distance between two adjacent products or materials should be adjusted in order to make the process smooth.

In the prior art, the means for changing the distance between the multiple products or materials in the production process are usually manually operated. The manually operated way consumes more manpower and also is inconvenient and inaccurate.

SUMMARY OF THE INVENTION

The main objective of the present invention is to provide an automatic pitch adjustment machine that can automatically deploy the components to be separated at intervals of a specific distance.

The automatic pitch adjustment machine has a base board, a first slide rail set, a transfer set, a second slide rail set, a cylinder adapter plate, and a material carrier set. The first slide rail set is mounted on the top surface of the base board. The transfer set has multiple transfer blocks, and each one of the transfer blocks is fixed to a respective lower sliding block of the second slide rail set. The second slide rail set has multiple short rails and multiple upper sliding blocks. The cylinder adapter plate has a driving plate and multiple driving pillars. The material carrier set has multiple material fixing boards, and the multiple material fixing boards are spaced at intervals.

Other objects, advantages, and novel features of the invention will become more apparent from the following detailed description when taken in conjunction with the accompanying drawings.

DETAILED DESCRIPTION OF PREFERRED EMBODIMENT

Figure 1:
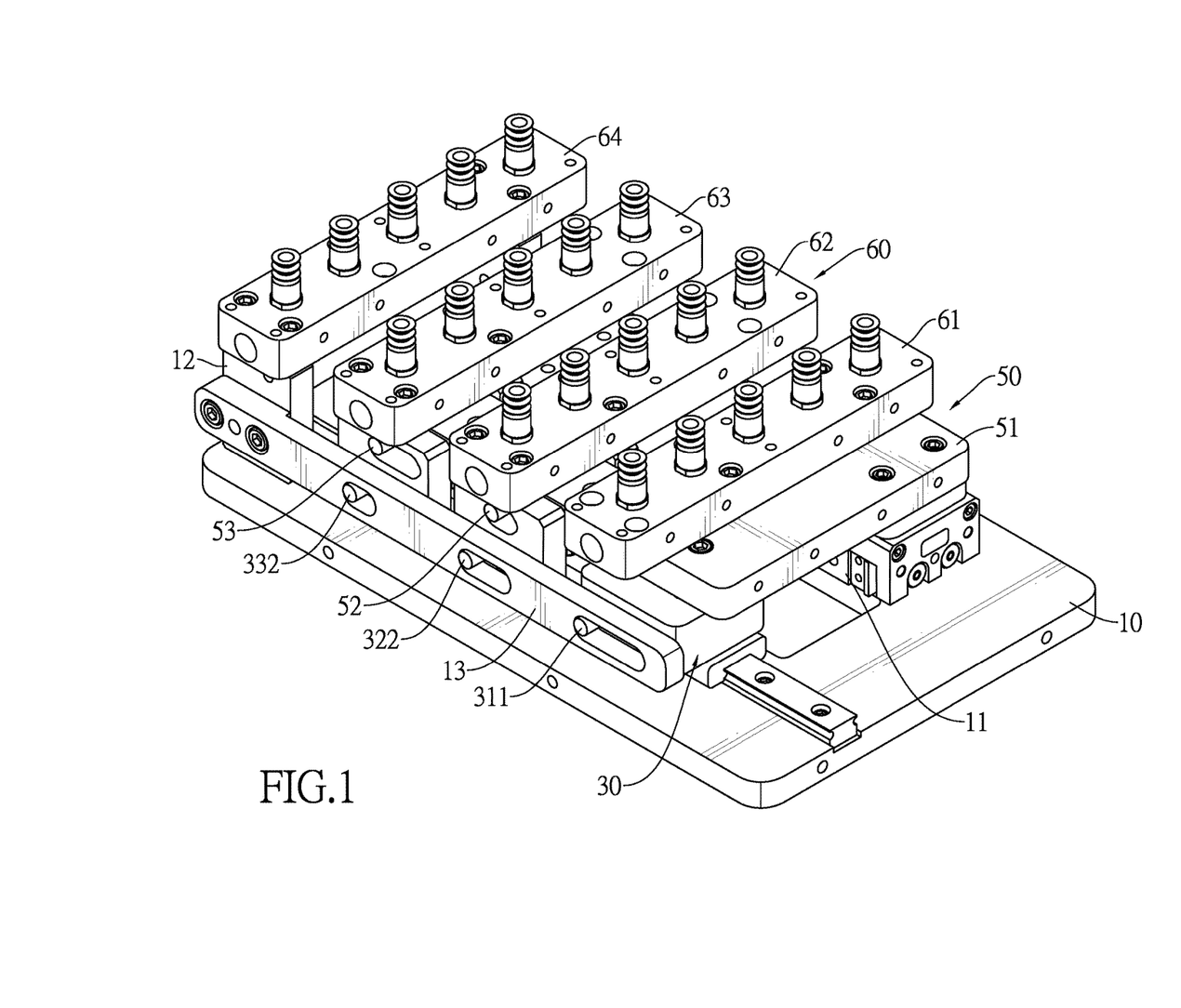
FIG. 1 is a perspective view of an automatic pitch adjustment machine in accordance with the present invention.
Figure 2:
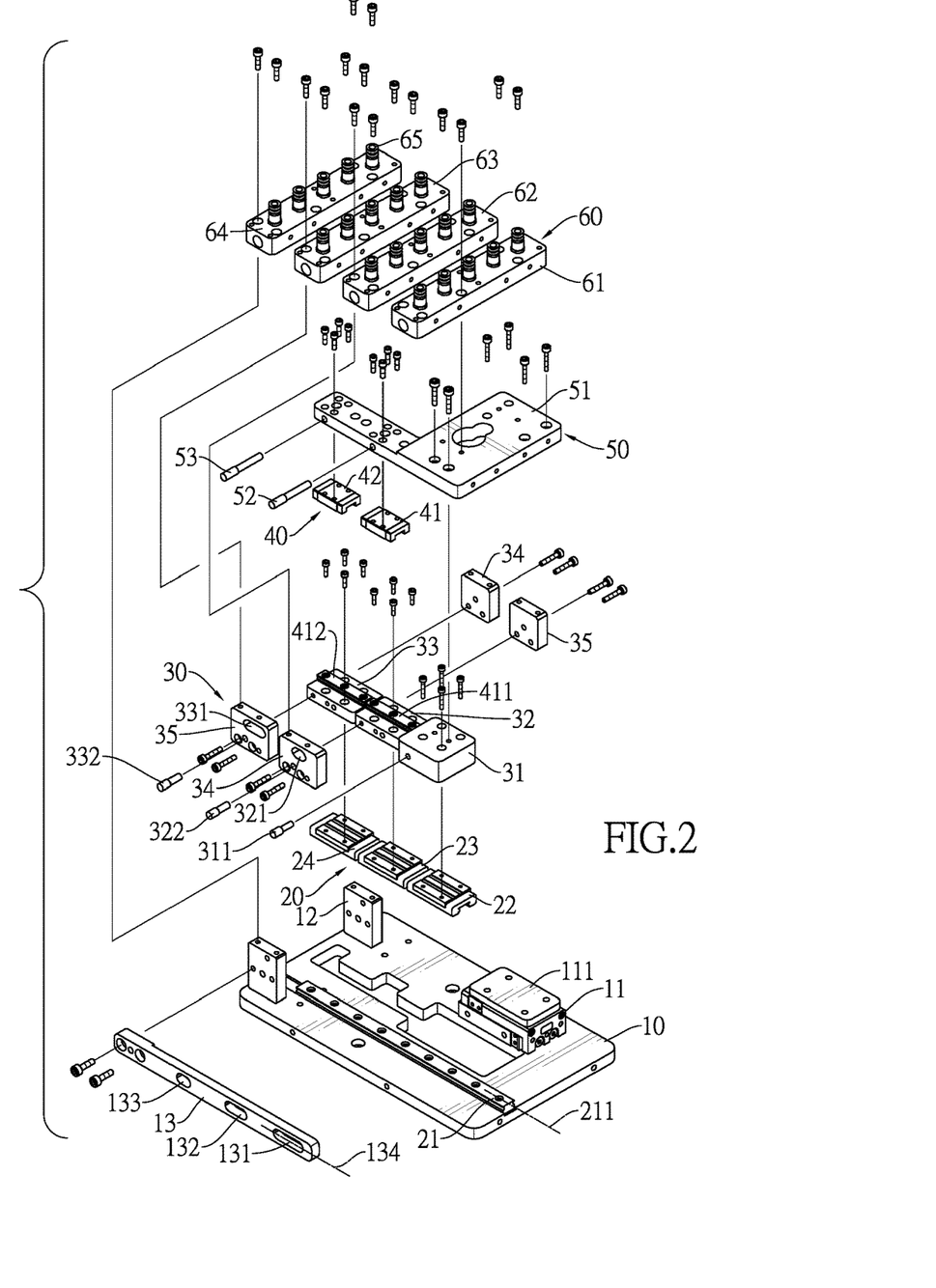
FIG. 2 is an exploded perspective view of the automatic pitch adjustment machine in FIG. 1.

With reference to FIGS. 1 and 2, an automatic pitch adjustment machine in accordance with the present invention comprises a base board 10, a first slide rail set 20, a transfer set 30, a second slide rail set 40, a cylinder adapter plate 50, and a material carrier set 60.

The base board 10 has a cylinder set 11, at least one fixed pillar 12, and a positioning board 13. The cylinder set 11 is mounted on a top surface of the base board 10 and has a sliding board 111. The sliding board 111 is movable and has a moving direction. The sliding board 111 is driven by fluid. For example, the cylinder set 11 is a pneumatic cylinder. The sliding board 111 can be reciprocately driven by the pneumatic cylinder. The sliding board 111 may be conventional and the detailed description thereof is omitted.

The at least one fixed pillar 12 is mounted on the top surface of the base board 10 and is away from the cylinder set 11. Preferably, the base board 10 has two fixed pillars 12. The two fixed pillars 12 are disposed on the top surface of the base board 10 at a spaced interval. Each one of the fixed pillars 12 can be mounted and fixed on the base board 10 by fixing means. For example, the combination of the screw and screw hole is one of the fixing means. The positioning board 13 is an elongated board and has a first end and a second end. The first end of the positioning board 13 is fixed to one of the two fixed pillars 12. The positioning board 13 has multiple positioning holes and a first transverse axis 134. Each one of the positioning holes is formed through the positioning board 13 and is an elongated hole. Each one of the positioning holes has a rectangle and two circles. The rectangle of each positioning hole has two side edges. The two circles of each positioning hole are respectively formed at the two side edges of the rectangle of the positioning hole and each circle has a center. The first transverse axis 134 is parallel with the direction of the positioning holes and the moving direction of the sliding board 111.

Preferably, the multiple positioning holes include a first positioning hole 131, a second positioning hole 132, and a third positioning hole 133. The distance between the two centers of the circles of the first positioning hole 131 is triple the distance between the two centers of the circles of the third positioning hole 133. The distance between the two centers of the circles of the second positioning hole 132 is double the distance between the two centers of the circles of the third positioning hole 133.

Figure 3:
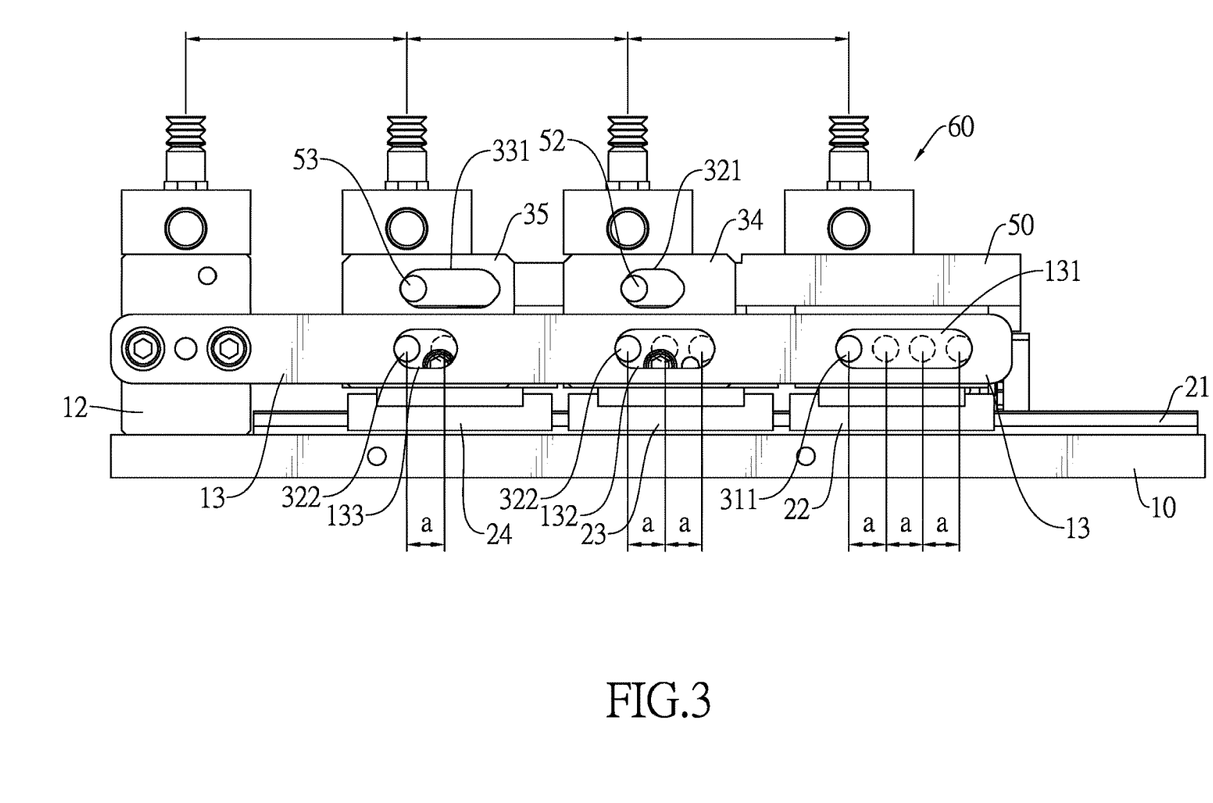
FIG. 3 is a side view of the automatic pitch adjustment machine in FIG. 1.
Figure 4:
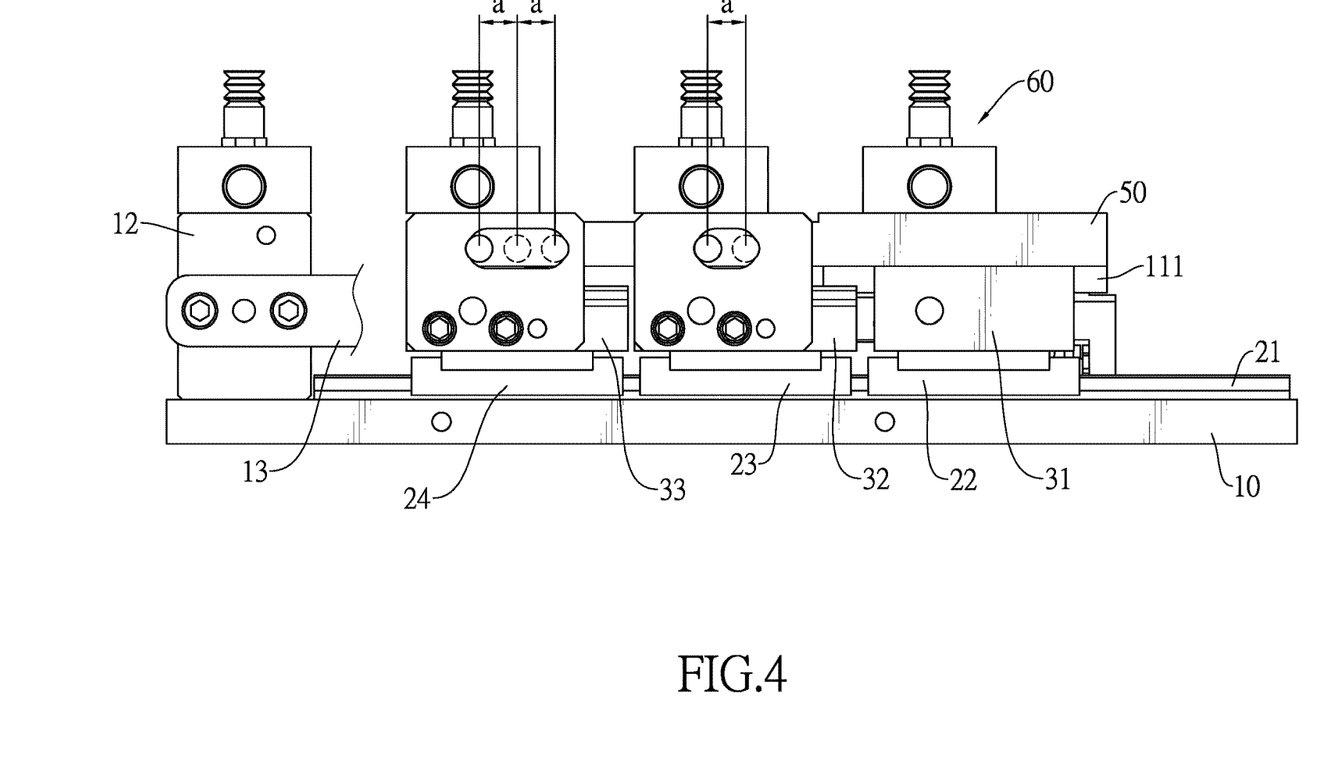
FIG. 4 is a side view in partial section of the automatic pitch adjustment machine in FIG. 1.

With reference to FIGS. 3 and 4, the first slide rail set 20 is mounted on the top surface of the base board 10, and has a long rail 21 and multiple lower sliding blocks. The long rail 21 is mounted on the top surface of the base board 10. The long rail 21 has a second transverse axis 211 parallel with the moving direction of the sliding board 111. Each one of the multiple lower sliding blocks is mounted on the long rail 21 and can move relative to the long rail 21.

With further reference to FIG. 2, the long rail 21 is located between the two fixed pillars 12. The multiple lower sliding blocks include a first lower sliding block 22, a second lower sliding block 23, and a third lower sliding block 24. The first lower sliding block 22, the second lower sliding block 23, and the third lower sliding block 24 can move relative to the long rail 21.

The transfer set 30 has multiple transfer blocks, and each one of the transfer blocks is fixed to a respective one of the lower sliding blocks. Each one of the transfer blocks has a protruding positioning pillar. Each one of the positioning pillars is mounted through the positioning hole of a corresponding positioning board 13, and this makes the moving position of the multiple transfer blocks limited by the corresponding positioning pillar. Each one of the transfer blocks has a pushing hole, and the pushing holes of the transfer blocks have different lengths. Each one of the pushing holes has a third transverses axis parallel with the moving direction of the moving board 111.

With reference to FIG. 2, the multiple transfer blocks include a first transfer block 31, a second transfer block 32, and a third transfer block 33. The first transfer block 31 is connected to the first lower sliding block 22. The second transfer block 32 is connected to the second lower sliding block 23. The third transfer block 33 is connected to the third lower sliding block 24. Furthermore, the first transfer block 31 has a side surface and a first positioning pillar 311. The first positioning pillar 311 is mounted at the side surface of the first transfer block 31. The second transfer block 32 has a first pushing hole 321 and a second positioning pillar 322. The third transfer block 33 has a second pushing hole 331 and a third positioning pillar 332. The first pushing hole 321 is an elongated hole. The second pushing hole 331 is an elongated hole. Furthermore, a fourth axis of the first pushing hole 321 and the second pushing hole 331 is parallel with the moving direction of the sliding board 111.

The first positioning pillar 311 of the first transfer board 31 is located in the first positioning hole 131, and this makes the movement of the first transfer board 31 limited by the first positioning hole 131. The second positioning pillar 322 of the second transfer block 32 is located in the second positioning hole 132, and this makes the movement of the second transfer block 32 limited by the second positioning hole 132. The third positioning pillar 332 of the third transfer board 33 is located in the third positioning hole 133, and this makes the movement of the third transfer board 33 limited by the third positioning hole 133.

With reference to FIG. 2, the second transfer block 32 has at least one second transfer board 34. Preferably, the at least one second transfer board 34 is fixed on a side surface of the second transfer block 32. The third transfer block 33 has at least one third transfer board 35. Preferably, the at least one third transfer board 35 is fixed to a side surface of the third transfer block 33. The first pushing hole 321 and the second positioning pillar 322 are located at the second transfer board 34. The second pushing hole 331 and the third positioning pillar 332 are located at the third transfer board 35. Furthermore, another second transfer board 34 is mounted on another side surface of the second transfer block 32. Another third transfer board 35 is mounted on another side surface of the third transfer block 33.

The second slide rail set 40 has multiple short rails and multiple upper sliding blocks. Each one of the short rails is mounted on a respective one of the transfer blocks. Each one of the upper sliding blocks is movably mounted on the short rail. Each one of the short rails has a fifth transverse axis parallel with the direction of the second transverse axis 211 of the long rail 21 and the moving direction of the sliding board 111. The multiple upper sliding blocks include first upper sliding blocks 41 and second upper sliding blocks 42. The short rails of the second slide rail 40 include a first short rail 411 and a second short rail 412. The first short rail 411 is fixed to the second transfer block 32. The second short rail 412 is fixed to the third transfer block 33.

The cylinder adapter plate 50 has a driving plate 51 and multiple driving pillars. The driving plate 51 is fixed to the sliding board 111 of the cylinder set 11, and has a first side surface and a second side surface. The first side surface of the driving plate 51 is fixed to the sliding board 111 of the cylinder set 11. The second side surface is fixed to the second slide rail set 40. The driving plate 51 is driven by the cylinder set 11 and may move relative to the base board 10. The multiple driving pillars are located in one of the transfer blocks of the transfer set 30.

With reference to FIG. 2, the driving plate 51 is L-shaped. The multiple driving pillars include a first driving pillar 52 and a second driving pillar 53. The first driving pillar 52 is mounted in the first pushing hole 321 of the second transfer block 32. The second driving pillar 53 is located in the second pushing hole 331 of the third transfer block 33. When the driving plate 51 moves, the first driving pillar 52 moves in the first pushing hole 321, and the second driving pillar 53 moves in the second pushing hole 331.

The material carrier set 60 has multiple material fixing boards, and the multiple material fixing boards are disposed at spaced intervals. The disposal direction of the multiple material fixing boards is parallel with the second transverse axis 211 of the long rail 21 and the moving direction of the sliding board 111. The multiple material fixing boards 61 include a first material fixing board 61, a second material fixing board 62, a third material fixing board 63, and a fourth material fixing board 64. The first material fixing board 61 is fixed to the driving plate 51. The fourth material fixing board 64 is fixed to the fixed pillar 12. The second material fixing board 62 and the third material fixing board 63 are fixed to the transfer blocks of the transfer set 30. Each one of the material fixing boards 61,62,63,64 has multiple suction nozzles 65 that are disposed at spaced intervals. Each suction nozzle 65 has a first end and a second end, the first end of each suction nozzle 65 is connected to a negative pressure generator, and the second end of each suction nozzle 65 provides a suction force. Therefore, the second end of each suction nozzle 65 can suck a material or product to be transferred.

With reference to FIG. 2, the material carrier set 60 has the four material fixing boards 61, 62, 63, 64. As aforementioned, the first material fixing board 61 is fixed to the driving board 51. The fourth material fixing board 64 is fixed to the fixed pillar 12. The second material fixing board 62 is fixed to the second transfer block 32 or fixed by the second transfer board 34. The third material fixing board 63 is fixed to the third transfer block 33 or fixed by the third transfer board 35.

With reference to FIGS. 3 and 4, the material carrier set 60 has the four material fixing boards 61. The four material fixing boards 61 are disposed at spaced intervals. The material fixing boards 61 cannot be moved relative to the base board 10.

Figure 5:
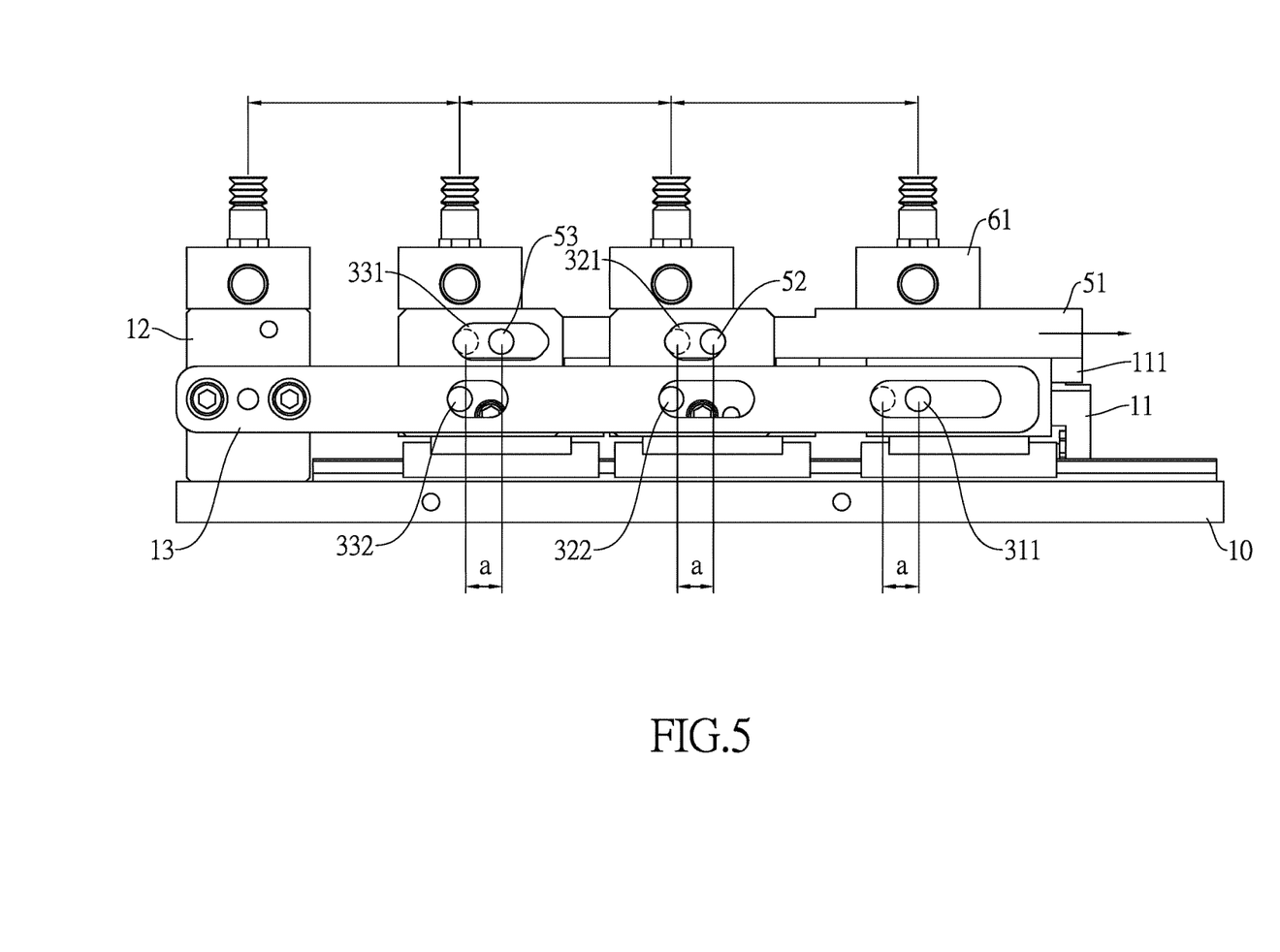
FIG. 5 is an operational side view of the automatic pitch adjustment machine in FIG. 1.

With reference to FIG. 5, the cylinder set 11 drives the sliding board 111 to move the driving plate 51 of the cylinder adapter plate 50. The driving plate 51 moves rightward in a distance. The first driving pillar 52 of the driving plate 51 moves in the first pushing hole 321 of the second transfer block 32 and abuts the inner wall of the first pushing hole 321. The second driving pillar 53 moves in the second pushing hole 331 of the third transfer block 33 and abuts the inner wall of the second pushing hole 331. The distance between the first material fixing boards 61 and the second material fixing boards 62 is different from the distance between the second material fixing boards 62 and the third material fixing board 63.

Figure 6:
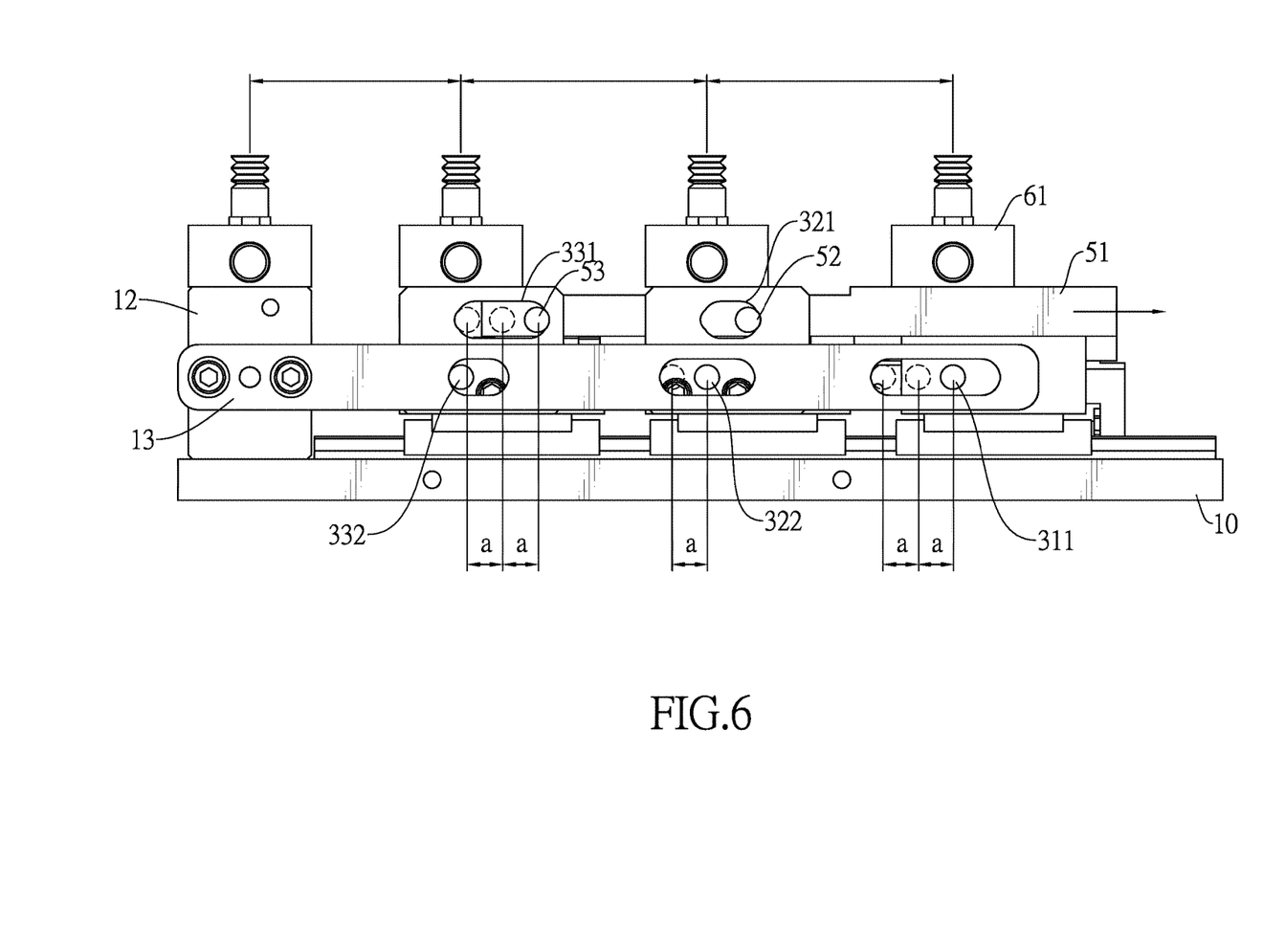
FIG. 6 is another operational side view of the automatic pitch adjustment machine in FIG. 1.

With reference to FIG. 6, the driving plate 51 of the cylinder adapter plate 50 moves rightward. The first driving pillar 52 of the driving plate 51 abuts the wall of the first pushing hole 321 and pushes the second transfer block 32 or the second transfer board 34 to move. The second driving pillar 53 moves in the second pushing hole 331 of the third transfer block 33 and abuts the wall of the second pushing hole 331. The distance between the first material fixing board 61 and the second material fixing board 62 is the same as the distance between the second material fixing board 62 and the third material fixing board 63.

Figure 7:
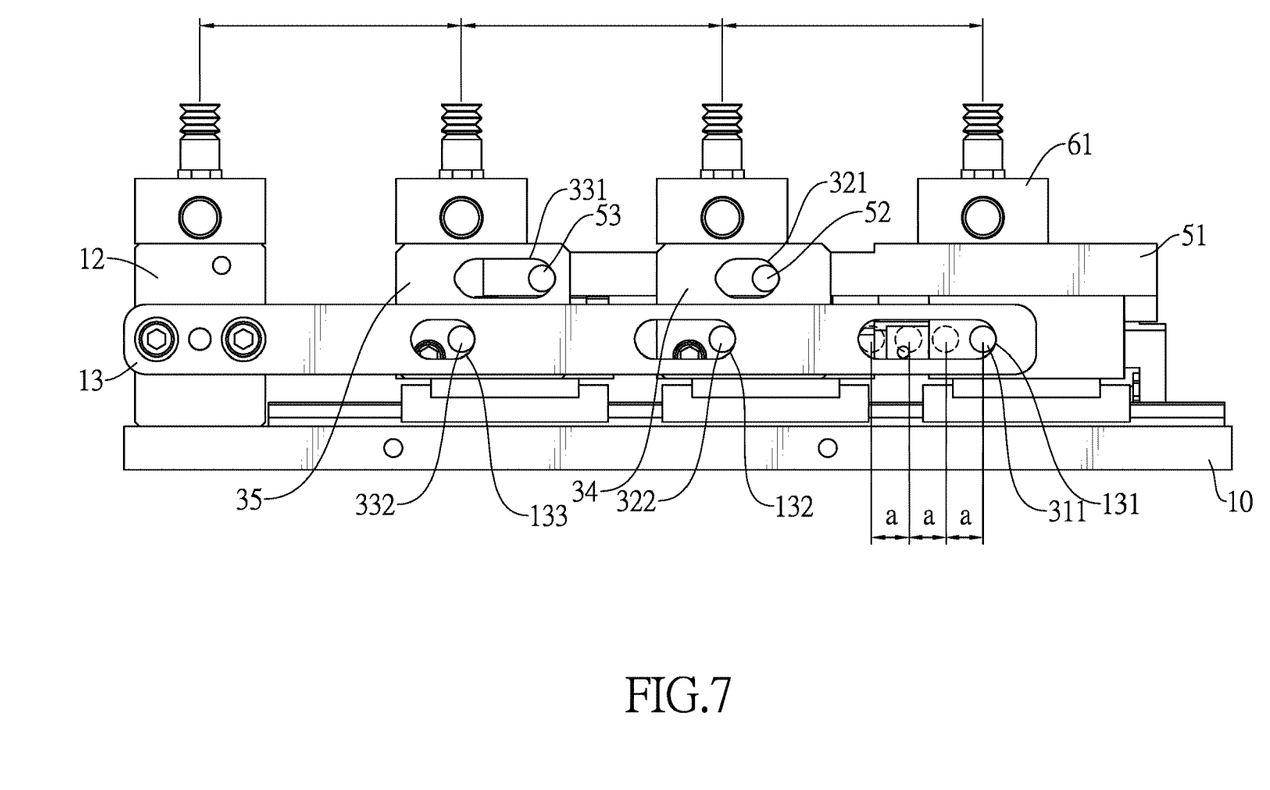
FIG. 7 is another operational side view of the automatic pitch adjustment machine in FIG. 1.

With reference to FIG. 7, the driving plate 51 of the cylinder adapter plate 50 moves rightward. At the same time, the first driving pillar 52 of the driving plate 51 continually abuts the wall of the first pushing hole 321, and pushes the second transfer block 32 or the second transfer board 34 and drives the second transfer block 32 to move. Furthermore, the second driving pillar 53 of the driving plate 51 abuts the wall of the second pushing hole 331, and pushes the third transfer block 33 or the third transfer board 35 to move. When each material fixing board 61 moves to a specific position, the first positioning pillar 311 abuts the wall of the first positioning hole 131. The second positioning pillar 322 abuts the wall of the second positioning hole 132. The third positioning pillar 332 abuts the wall of the first positioning hole 131. The distance between two adjacent material fixing boards 61 is the same.

When the cylinder set 11 drives the driving plate 51 of the cylinder adapter plate 50 to move backward, the material fixing board 61 fixed to the driving plate 51 moves. The first driving pillar 52 and the second driving pillar 53 respectively move in and abut the wall of the first pushing hole 321 and the second pushing hole 331, and this makes each material fixing board 61 move toward the fixed pillars 12. With reference to FIG. 3, the distance between two adjacent material fixing boards 61 decreases.

With the technical means described above, the material fixing boards 61 of the material carrier set 60 can be rapidly and automatically arranged on the base plate 10 at specific intervals or restored to the initial interval.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:
1. An automatic pitch adjustment machine comprising:
a base board having
a cylinder set having
a sliding board being movable and having a moving direction;
at least one fixed pillar; and
a positioning board being an elongated board and having
a first end fixed to the at least one fixed pillar;
a second end;
multiple positioning holes, the multiple positioning holes having different lengths; and
a first transverse axis being parallel with the moving direction of the sliding board;
a first slide rail set mounted on a top surface of the base board and having
a long rail mounted on the top surface of the base board and having a second transverse axis, the second transverse axis of the long rail being parallel with the moving direction of the sliding board; and
multiple lower sliding blocks slidably mounted on the long rail;
a transfer set having
multiple transfer blocks, each one of the transfer blocks fixed to a respective one of the lower sliding blocks and having
positioning pillars each mounted through a respective one of the positioning holes of the positioning board, each one of the transfer blocks having a pushing hole, and the pushing holes of the transfer blocks having different lengths, each one of the pushing holes having a third transverses axis, the third transverses axis of each pushing hole being parallel with the moving direction of the sliding board;
a second slide rail set having
multiple short rails each mounted on a respective one of the transfer blocks; and
multiple upper sliding blocks each movably mounted on a respective one of the short rails, each one of the short rails having a fifth transverse axis being parallel with the second transverse axis of the long rail and the moving direction of the sliding board;
a cylinder adapter plate having
a driving plate fixed to the sliding board of the cylinder set and the second slide rail set; and
multiple driving pillars located in the pushing holes of the transfer set;
a material carrier set having
multiple material fixing boards disposed at spaced intervals, and a disposal direction of the multiple material fixing boards being parallel with the second transverse axis of the long rail and the moving direction of the sliding board, one of the material fixing boards fixed to the driving plate, another one of the material fixing boards fixed to the fixed pillar, and the remaining material fixing boards fixed to the transfer blocks of the transfer set.

2. The automatic pitch adjustment machine as claimed in claim 1, wherein each transfer block has at least one transfer board mounted on a side surface of the transfer block, and each pushing hole and each positioning pillar are mounted on the at least one transfer board.

3. The automatic pitch adjustment machine as claimed in claim 2, wherein
the multiple positioning holes of the positioning board include a first positioning hole, a second positioning hole, and a third positioning hole, wherein each one of the positioning holes has a rectangle and two circles, the rectangle of each positioning hole has two side edges, the two circles of each positioning hole are respectively formed at the two side edges of the rectangle of each positioning hole,the distance between two centers of the circles of the first positioning hole is triple the distance between two centers of the circles of the third positioning hole, the distance between two centers of the circles of the second positioning hole is double the distance between the two centers of the circles of the third positioning hole;
the second slide rail set includes
a first lower sliding block movably mounted on the long rail;
a second lower sliding block movably mounted on the long rail; and a third lower sliding block movably mounted on the long rail;

the multiple transfer blocks of the transfer set include a first transfer block connected to the first lower sliding block, and having a side surface and a first said positioning pillar, the first positioning pillar formed at the side surface of the first transfer block, the first positioning pillar located in the first positioning hole of the positioning board;

a second transfer block connected to the second lower sliding block, and having a first said pushing hole and a second multiple positioning holes of the positioning pillar, the first pushing hole being an elongated hole, the second positioning pillar located in the first positioning hole of the positioning board;

a third transfer block connected to the third lower sliding block, and having a second said pushing hole and a third said positioning pillar, the second pushing hole being an elongated hole and the third positioning pillar located in the second positioning hole of the positioning board.

4. The automatic pitch adjustment machine as claimed in claim 3, wherein the second slide rail set includes two said short rails respectively fixed to the second transfer block and the third transfer block;

a first upper sliding block movably mounted on the two short rails; and a second upper sliding block movably mounted on the two short rails;

the driving plate of the cylinder adapter plate is fixed to the first upper sliding block and the second upper sliding block, and the multiple driving pillars of the cylinder adapter plate include a first driving pillar located in the second pushing hole of the second transfer block; and a second driving pillar located in the third pushing hole of the third transfer block.

5. The automatic pitch adjustment machine as claimed in claim 4, wherein the second transfer block has at least one second transfer board, the second pushing hole and the second positioning pillar disposed on the at least one second transfer board; and the third transfer block has at least one third transfer board, the third pushing hole and the third positioning pillar disposed on the at least one third transfer board.

6. The automatic pitch adjustment machine as claimed in claim 1, wherein the base board includes two fixed pillars disposed at a spaced interval, and one of the material fixing boards is connected to the two fixed pillars.

7. The automatic pitch adjustment machine as claimed in claim 3, wherein the multiple positioning holes of the positioning board include a first positioning hole, a second positioning hole, and a third positioning hole, wherein each one of the positioning holes has a rectangle and two circles, the rectangle of each positioning hole has two side edges, the two circles of each positioning hole are respectively formed at the two side edges of the rectangle of the positioning hole and each have a center, the distance between the two centers of the circles of the first positioning hole is triple the distance between the two centers of the circles of the third positioning hole, the distance between the two centers of the circles of the second positioning hole is double the distance between the two centers of the circles of the third positioning hole;

the second slide rail set includes a first lower sliding block movably mounted on the long rail;

a second lower sliding block movably mounted on the long rail; and a third lower sliding block movably mounted on the long rail;

the transfer set includes a first transfer block connected to the first lower sliding block, and having a side surface and a first said positioning pillar, the first positioning pillar formed at the side surface of the first transfer block, the first positioning pillar located in the first positioning hole of the positioning board;

a second transfer block connected to the second lower sliding block, and having a first said pushing hole and a second said positioning pillar, the first pushing hole being an elongated hole, the second positioning pillar located in the first positioning hole of the positioning board;

a third transfer block connected to the third lower sliding block, and having a second said pushing hole and a third said positioning pillar, the second pushing hole being an elongated hole and the third positioning pillar located in the second positioning hole of the positioning board.

8. The automatic pitch adjustment machine as claimed in claim 7, wherein the second slide rail set includes two said short rails respectively fixed to the second transfer block and the third transfer block;

a first upper sliding block movably mounted on the two short rails; and a second upper sliding block movably mounted on the two short rails;

the driving plate of the cylinder adapter plate is fixed to the first upper sliding block and the second upper sliding block, and the multiple driving pillars of the cylinder adapter plate include a first driving pillar located in the second pushing hole of the second transfer block; and a second driving pillar located in the third pushing hole of the third transfer block.

9. The automatic pitch adjustment machine as claimed in claim 8, wherein the second transfer block has at least one second transfer board, the second pushing hole and the second positioning pillar disposed on the at least one second transfer board; and the third transfer block has at least one third transfer board, the third pushing hole and the third positioning pillar disposed on the at least one third transfer board.

10. The automatic pitch adjustment machine as claimed in claim 1, wherein the multiple positioning holes of the positioning board include a first positioning hole, a second positioning hole, and a third positioning hole, wherein each one of the positioning holes has a rectangle and two circles, the rectangle of each positioning hole has two side edges, the two circles of each positioning hole are respectively formed at the two side edges of the rectangle of each positioning hole, the distance between two centers of the circles of the first positioning hole is triple the distance between two centers of the circles of the third positioning hole, the distance between two centers of the circles of the second positioning hole is double the distance between the two centers of the third positioning hole;

the second slide rail set includes
- a first lower sliding block movably mounted on the long rail;
- a second lower sliding block movably mounted on the long rail; and
- a third lower sliding block movably mounted on the long rail;

the multiple transfer blocks of the transfer set include
- a first transfer block connected to the first lower sliding block, and having a side surface and a first said positioning pillar, the first positioning pillar formed at the side surface of the first transfer block, the first positioning pillar located in the first positioning hole of the positioning board;
- a second transfer block connected to the second lower sliding block, and having a first said pushing hole and a second said positioning pillar, the first pushing hole being an elongated hole, the second positioning pillar located in the first positioning hole of the positioning board;
- a third transfer block connected to the third lower sliding block, and having a second said pushing hole and a third said positioning pillar, the second pushing hole being an elongated hole and the third positioning pillar located in the second positioning hole of the positioning board.

11. The automatic pitch adjustment machine as claimed in claim 10, wherein the second slide rail set includes
- two said short rails respectively fixed to the second transfer block and the third transfer block;
- a first upper sliding block movably mounted on the two short rails; and
- a second upper sliding block movably mounted on the two short rails;

the driving plate of the cylinder adapter plate is fixed to the first upper sliding block and the second upper sliding block, and the multiple driving pillars of the cylinder adapter plate include
- a first driving pillar located in the second pushing hole of the second transfer block; and
- a second driving pillar located in the third pushing hole of the third transfer block.

12. The automatic pitch adjustment machine as claimed in claim 11, wherein the second transfer block has
- at least one second transfer board, the second pushing hole and the second positioning pillar disposed on the at least one second transfer board; and the third transfer block has
- at least one third transfer board, the third pushing hole and the third positioning pillar disposed on the at least one third transfer board.

* * * * *